US010656896B2

(12) United States Patent
Paruchuri et al.

(10) Patent No.: US 10,656,896 B2
(45) Date of Patent: May 19, 2020

(54) DISPLAY MAPPING (71) Applicant: HEWLETT-PACKARD DEVELOPMENT COMPANY, L.P., Houston, TX (US)

(72) Inventors: Arun Kumar Paruchuri, Palo Alto, CA (US); Nelson L. Chang, Palo Alto, CA (US); Jason Jewell, Fremont, NE (US); Juan Pablo Sepulveda Lopez, Guadalajara (MX); Enrique Alejandro Pena Arenzana, Guadalajara (MX); Curtis N. Thetford, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/088,593

(22) PCT Filed: Sep. 20, 2016

(86) PCT No.: PCT/US2016/052595
§ 371 (c)(1),
(2) Date: Sep. 26, 2018

(87) PCT Pub. No.: WO2018/056948
PCT Pub. Date: Mar. 29, 2018

(65) Prior Publication Data
US 2019/0102137 A1 Apr. 4, 2019

(51) Int. Cl.
*G06F 3/14* (2006.01)
*H04N 21/2668* (2011.01)
(Continued)

(52) U.S. Cl.
CPC .......... *G06F 3/1454* (2013.01); *G09G 5/005* (2013.01); *G09G 5/14* (2013.01); *H04N 21/2668* (2013.01);
(Continued)

(58) Field of Classification Search
CPC .......... G06F 3/1454; G09G 5/005; G09G 5/14
See application file for complete search history.

(56) References Cited

U.S. PATENT DOCUMENTS 8,290,128 B2 * 10/2012 Qiu .......................... H04N 7/15
348/14.09
8,369,541 B2   2/2013 Joiner et al.
(Continued)

FOREIGN PATENT DOCUMENTS

JP   2000184346   6/2000
JP   2006217628   8/2006
(Continued)

OTHER PUBLICATIONS

TERMSERV, "Windows Desktop Sharing API—Remote Desktop Services Blog", Retrieved from Internet: https://blogs.msdn.microsoft.com/rds/2007/03/08/windows-desktop-sharing-api/, Mar. 8, 2007, 15 pages.
(Continued)

*Primary Examiner* — Ariel A Balaoing
(74) *Attorney, Agent, or Firm* — HP Inc. Patent Department (57) ABSTRACT Examples associated with display mapping are described. One example system includes a display mapping module. The display mapping module maps display components connected to the system to virtual channels to which the system is subscribed. A communication module transmits a content instruction to subscribers of a virtual channel. The instruction controls the subscribers of the virtual channel to display content associated with the content instruction on display components the respective subscribers have mapped to the virtual channel. A display module causes a display component mapped to the virtual channel to display content associated with the content instruction.

14 Claims, 6 Drawing Sheets (51) Int. Cl.
*H04N 21/466* (2011.01)
*G09G 5/00* (2006.01)
*G09G 5/14* (2006.01)

(52) U.S. Cl.
CPC ..... *H04N 21/4668* (2013.01); *G09G 2370/02* (2013.01); *G09G 2370/20* (2013.01)

(56) References Cited

U.S. PATENT DOCUMENTS

| | | | |
|---|---|---|---|
| 9,131,022 B2 | 9/2015 | Degrazia | |
| 2006/0184624 A1* | 8/2006 | Thukral | H04N 7/15 709/204 |
| 2012/0050457 A1* | 3/2012 | Gu | H04N 21/234327 348/14.13 |
| 2013/0139193 A1* | 5/2013 | Fan | H04N 7/157 725/14 |
| 2014/0282229 A1 | 9/2014 | Laukkanen et al. | |
| 2015/0007213 A1 | 1/2015 | Donoghue et al. | |
| 2015/0026734 A1 | 1/2015 | Ellis | |
| 2016/0246560 A1* | 8/2016 | Petrov | G06F 3/1438 |

FOREIGN PATENT DOCUMENTS

| | | |
|---|---|---|
| WO | WO-2010021047 | 2/2010 |
| WO | WO-2011150128 | 12/2011 |

OTHER PUBLICATIONS

"Screen Sharing for Collaboration in Teams", Screenhero, Retrieved from Internet: https://screenhero.com/, Apr. 19, 2016, 4 pages.

\* cited by examiner

DISPLAY MAPPING

BACKGROUND

Teleconferencing technologies are used to communicate across vast distances and involving multiple parties. Some teleconferencing technologies employ screen sharing techniques that scrape images from a display and then distribute the images to others involved in the teleconference. Other technologies employ a distributed set of slides, and advance through the slides under the control of a leader.

BRIEF DESCRIPTION OF THE DRAWINGS

The present application may be more fully appreciated in connection with the following detailed description taken in conjunction with the accompanying drawings.

DETAILED DESCRIPTION

Systems, methods, and equivalents associated with display mapping are described. In various examples, teleconferencing may be achieved using virtual channels. Virtual channels may be used to control displays that are mapped to the virtual channel to display content published to the virtual channel. By way of illustration, a user with multiple monitors may have different monitors mapped to different virtual channels. When the user directs content to be displayed on one of the virtual channels, a controller may cause that content to be displayed on a monitor associated with that virtual channel.

Additionally, if other use systems are subscribed to the virtual channel, a signal identifying the content may be transmitted to the systems. This signal may cause displays (or portions thereof) the other users have mapped to the virtual channel to show the content. In various examples, using virtual channels may avoid screen scraping images by causing individual users' systems to access data to be displayed on the virtual channels. Further, publishing content to a virtual channel may facilitate progressing a discussion naturally as opposed to according to a set of prepared, ordered slides.

Figure 1:
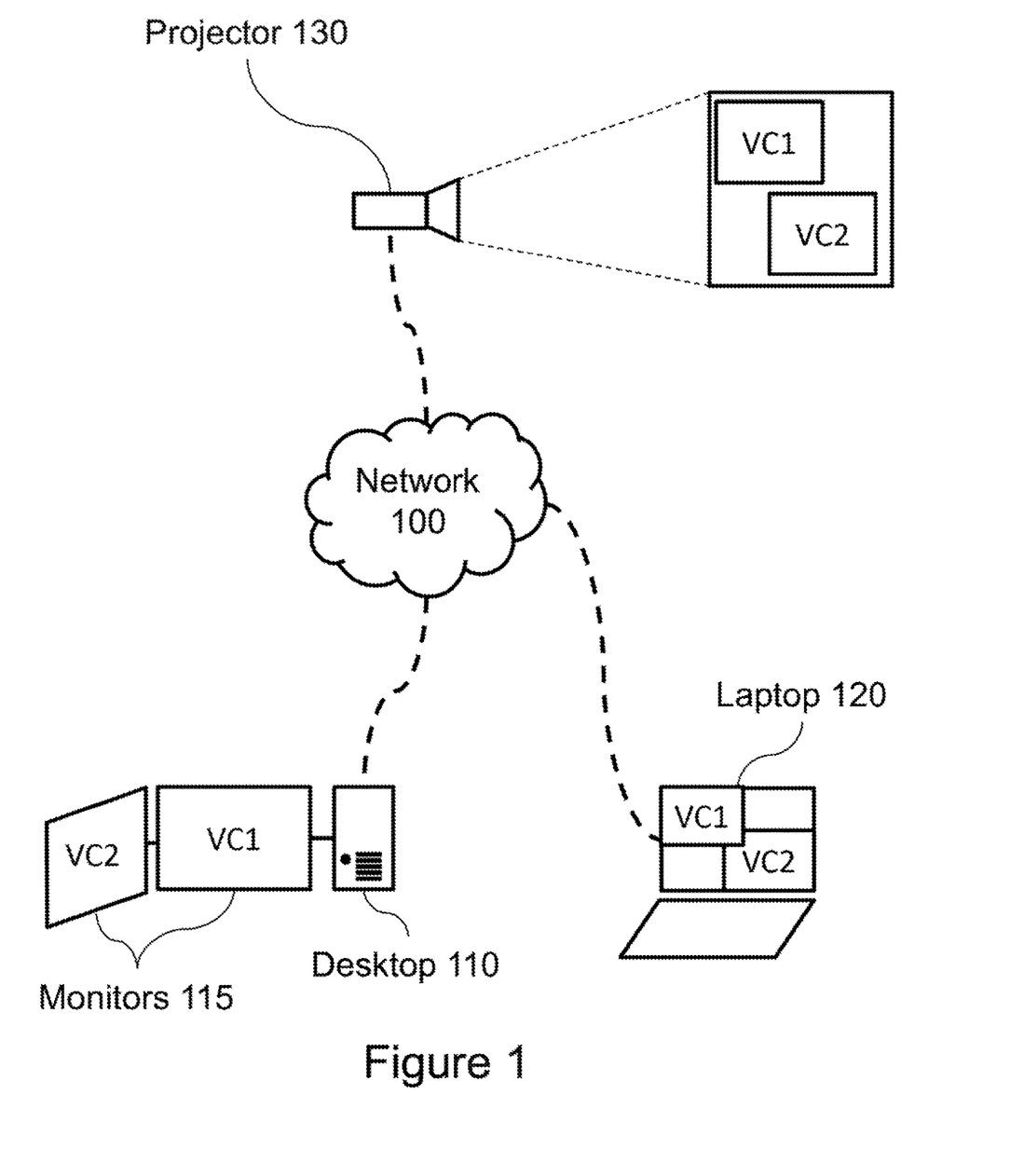
FIG. 1 illustrates an example devices associated with display mapping.

FIG. 1 illustrates example devices associated with display mapping. It should be appreciated that the items depicted in FIG. 1 are illustrative examples, and many different systems, devices, and so forth, may operate in accordance with various examples.

FIG. 1 illustrates a set of example devices connected via a network 100. Network 100 may be, for example, an intranet, the Internet, a wireless network, a virtual private network, a messaging bus, and so forth. Connected to network 100 are a desktop 110, a laptop 120, and a projector 130. Each of these devices is illustrated as showing two virtual channels, VC1 and VC2, in a different configuration on respective displays. Desktop 110 is displaying the virtual channels on monitors 115 attached to desktop 110. Laptop 120 is displaying the virtual channels overlapping one another on the screen of laptop 120, and projector 130 is projecting the virtual channels in a non-overlapping configuration. While an example involving two virtual channels is described, scenarios involving more or fewer virtual channels may be appropriate. Further, other systems (not shown) may also be connected involving other configurations and/or numbers of displays, including, for example, a television, a mobile device, a tablet, an augmented reality system, a virtual reality system, and so forth. Additionally, when reference is made to a display or display component herein, it is contemplated that the display could include a portion, subsection, window, and so forth within the display.

As used herein, a virtual channel may be a control framework for distributing content to displays. Individually, a system may, have a virtual channel mapped to a display component (e.g., monitors 115, laptop 120's screen, projections from projector 130). A content signal may be received by the system that tells the system that a content element should be displayed on a virtual channel. Upon receiving a content signal, the system may obtain the content element, and show the content element on a display that system has mapped to the identified virtual channel. Additionally, when a content signal originates from a system, that system may distribute the content signal to other systems the system knows are subscribed to the virtual channel. A content signal may originate from a system when, for example, a user controls the system to display a content element on a specified virtual channel.

By way of illustration, consider a user operating desktop 110. This user may be engaged in a teleconference with a user of laptop 120 and with a user of projector 130. The user of desktop 110 may have configured the call and/or desktop 110 to employ two virtual channels VC1 and VC2. Further the user may have mapped the two virtual channels to the monitors 115 attached to desktop 110. At the initiation of the teleconference, desktop 110 may indicate to projector 130 and laptop 120 that two virtual channels, VC1 and VC2, are involved in the call. At this point, users of laptop 120 and projector 130 may be prompted to designate displays accessible to their respective devices for displaying content published to the virtual channels VC1 and VC2. In some examples, the devices may recommend configurations of virtual channels and displays based on the displays detectible to the devices. Once a user has mapped a virtual channel to a display, that user's system may be considered to be subscribed to that virtual channel. Being subscribed to a virtual channel may cause content signals associated with that virtual channel to be received by and/or transmitted from that user's system, the content signals triggering content elements to be retrieved and shown on the display mapped to the virtual channel.

Eventually, the user of desktop 110 may publish a content element to one or more virtual channels. For example, consider a scenario where this user seeks to display a presentation slide on VC1 and a webpage on VC2. Initially, the user may control publication of these content elements to the respective virtual channels on desktop 110 via a user interface, peripheral, or other technique. Desktop 110 may then obtain these content elements, and transmit content signals to other devices subscribed to virtual channels VC1 and VC2. The user may control publication of these content elements using, for example, a peripheral attached to desktop 110, a device in communication with desktop 110 (e.g., a tablet), and so forth.

The presentation slide may be obtained, for example, from a presentation stored on desktop 110, from a presentation stored at a location remote to desktop 110, from a presentation stored on a storage (e.g., flash memory, cloud storage, network storage) connected to desktop 110, and so forth. The webpage may be obtained from a web server hosting the webpage based on a URL provided by the user. In other examples, a video feed may be obtained from its source, a file may be opened in its corresponding application (e.g., a document file may be opened in a word processing application and shown on the corresponding display), data may be aggregated according to a formula or equation, and so forth. Once obtained, the presentation slide may be shown on the monitor 115 mapped to virtual channel VC1 and the webpage may be shown on the monitor 115 mapped to virtual channel VC2.

Transmitting a content signal may involve, for example, sending an identifier to a content element and an identifier to a virtual channel on which the content element should be shown. Consequently, in the example detailed above, after the user designates that the presentation slide and webpage should be shown on virtual channels VC1 and VC2 respectively, desktop 110 may transmit this information to the other devices so that they too can display the presentation slide and webpage on displays mapped to the virtual channels. Desktop 110 may transmit the information to other devices via, for example, a client-server module where desktop 110 acts as either a client or a server, a peer-to-peer module, and so forth. In various examples, the identifier to the content element may include a location at which the content element may be retrieved, instructions for deriving the content element, and so forth. When the content element is stored on a system transmitting the content signal, the identifier to the content element may include the content element itself. This may be appropriate when, for example, the content element is a file or a portion of a file (e.g., a presentation slide) stored locally on a system transmitting the content signal.

Upon receiving a content signal, the systems receiving the content signal may obtain the content elements for themselves, and then show the content elements in the displays mapped to the virtual channels specified in the content signal. For example, laptop 120 may obtain the presentation slide and webpage, and display them on portions of the screen of laptop 120 that are mapped to the virtual channels. Projector 130, or a system controlling projector 130 may perform a similar process to cause.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

'Module', as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
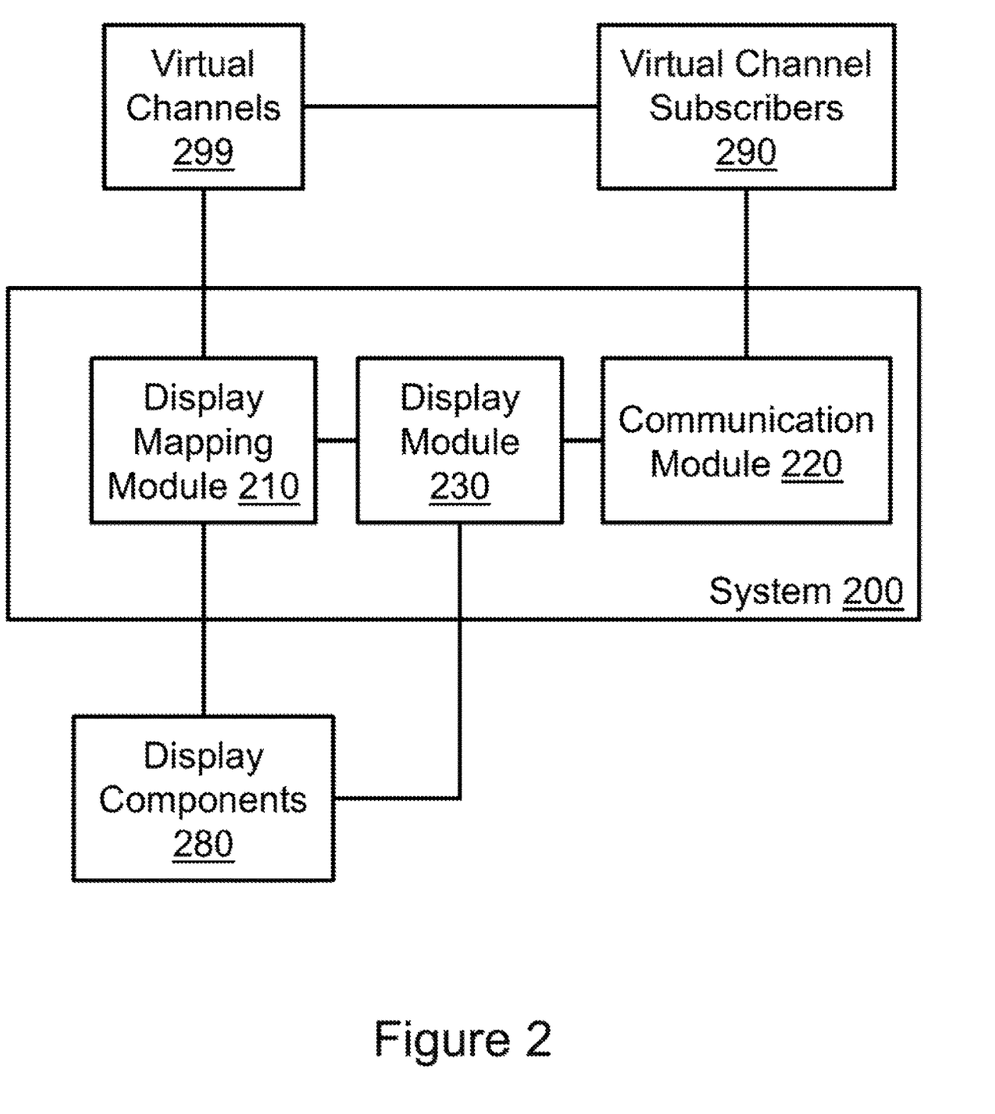
FIG. 2 illustrates an example system associated with display mapping.

FIG. 2 illustrates an example system 200 associated with display mapping. System 200 includes a display mapping module 210. Display mapping module 210 may map a set of display components 280 to a set of virtual channels 299. These display components may be connected to system 200. The set of display components may include, for example, a display (e.g., an LCD, a monitor, a touchscreen), a portion of a display, a projector, a television, a mobile device, a tablet, an augmented reality system, a virtual reality system, and so forth. Additionally, system 200 may subscribe to the virtual channels 299.

System 200 also includes a communication module 220. Communication module 220 may transmit a content instruction to subscribers 290 of a virtual channel. The content instruction may control subscribers 290 to display content associated with the content instruction on display components the respective subscribers have mapped to the virtual channel. In various examples, the content instruction may identify as content for display on the virtual channel, a file, an image, an application, a data set, a video, a location at which content may be obtained (e.g., a URL), a video stream, and so forth.

System 200 also includes a display module 230. Display module 230 may cause a display component 280 mapped to the virtual channel to display the content associated with the content instruction. In some examples, display mapping module 230 may also detect the members of the display components 280. In these examples, display mapping module may also detect attributes of the members of the set of display components (e.g., resolution, colors, display type, manufacturer) and report the attributes of the members of the set of the display components to a user. The user may use this information to aid in generating a desired mapping between display components 280 and virtual channels 299.

In some examples, communication module 220 may also receive a received content instruction. The received content instruction may be associated with a specified virtual channel to which system 200 is subscribed. The received content instruction may control display module 230 to cause a display component 280 mapped to the specified virtual channel 299 to display content associated with the received content instruction. In some examples, the received content instruction includes the content to be displayed on the display component 280 mapped to the specified virtual channel 299. The received content instruction may be received from a user controlling system 200. The user may control system 200 with a device connected to system 200 (e.g., a peripheral such as a mouse or keyboard), a device in communication with system 200 (e.g., a tablet networked with system 200), and so forth.

In some examples, system 200 may include a preset module (not shown). The preset module may control transmission of a preset set of content instructions to subscribers of a preset set of virtual channels.

Figure 3:
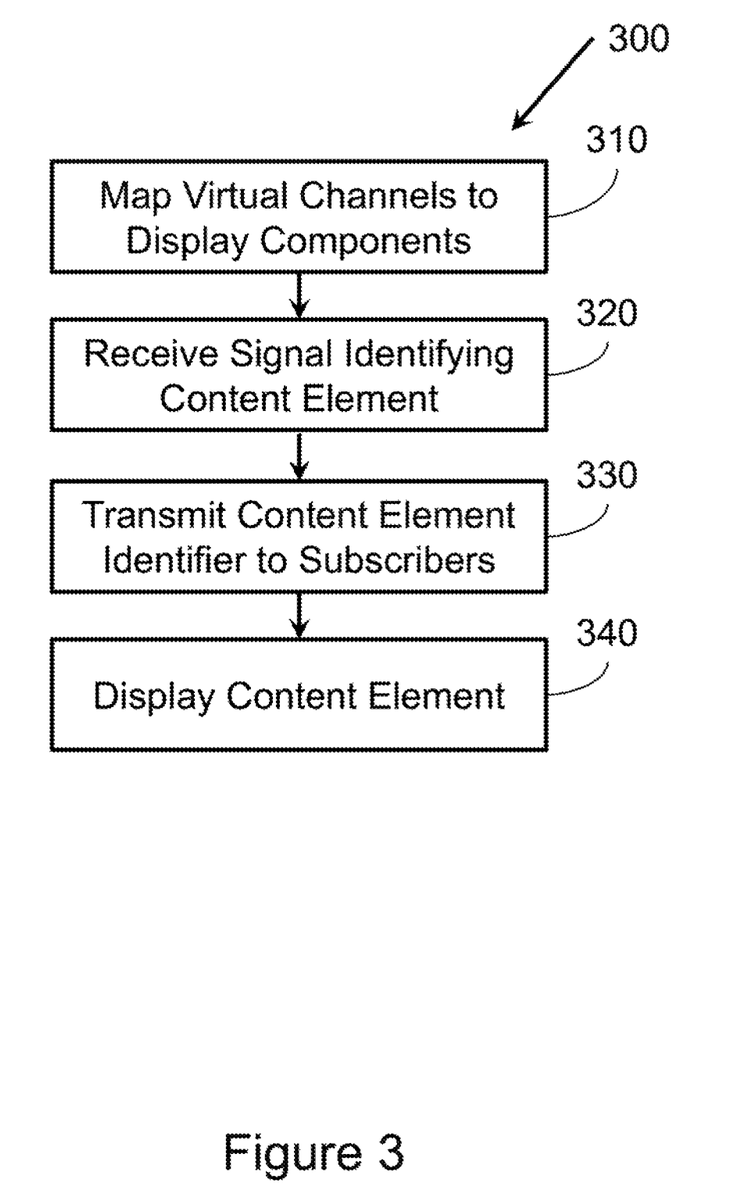
FIG. 3 illustrates a flowchart of example operations associated with display mapping.

FIG. 3 illustrates an example method 300 associated with display mapping. Method 300 may be embodied on a non-transitory processor-readable medium storing processor-executable instructions. The instructions, when executed by a processor, may cause the processor to perform method 300. In other examples, method 300 may exist within logic gates and/or RAM of an application specific integrated circuit (ASIC).

Method 300 includes mapping a set of virtual channels to a set of display components at 310. The display components may include, for example, a display (e.g., an LCD, a monitor, a touchscreen), a portion of a display, a projector, a television, a mobile device, a tablet, an augmented reality system, a virtual reality system, and so forth.

Method 300 also includes receiving a signal identifying a content element to be displayed on a virtual channel at 320. The content element may include, for example, a file, an image, an application, a data set, a video, a location at which content may be obtained (e.g., a URL), a video stream, and so forth. The signal identifying the content element to be displayed on the virtual channel may be received from a user of a first device. The signal may be received from an input device (e.g., keyboard, mouse, tablet), and so forth.

Method 300 also includes transmitting an identifier of the content element to subscribers of the virtual channel at 330. The identifier may control the subscribers of the virtual channel to display the content element on display components the respective subscribers have mapped to the virtual channel. Subscribers of the virtual channel may be users remote to the user of the first device. Further the subscribers of the virtual channel may be engaged in communication with the user of the first device. In various examples, the subscribers may have display setups that differ from the set of display components controlled by a device performing actions associated with method 300.

Method 300 also includes displaying the content element at 340. The content element may be displayed on a display component that is mapped to the virtual channel. The display component may have been mapped to the virtual channel by, for example, a user, automatically by a system performing method 300, and so forth. In some examples, the signal identifying the content element received at action 320 may include a set of content elements to be displayed on respective members of a set of virtual channels. In these examples, displaying the content element may include displaying members of the set of content elements on display components mapped to respective members of the set of virtual channels.

In some examples, method 300 may also include detecting the members of the set of display components, detecting attributes associated with the members of the set of display components, and providing these attributes to a user (not shown). This may allow the user to propose a mapping between virtual channels and display components in association with action 310.

Figure 4:
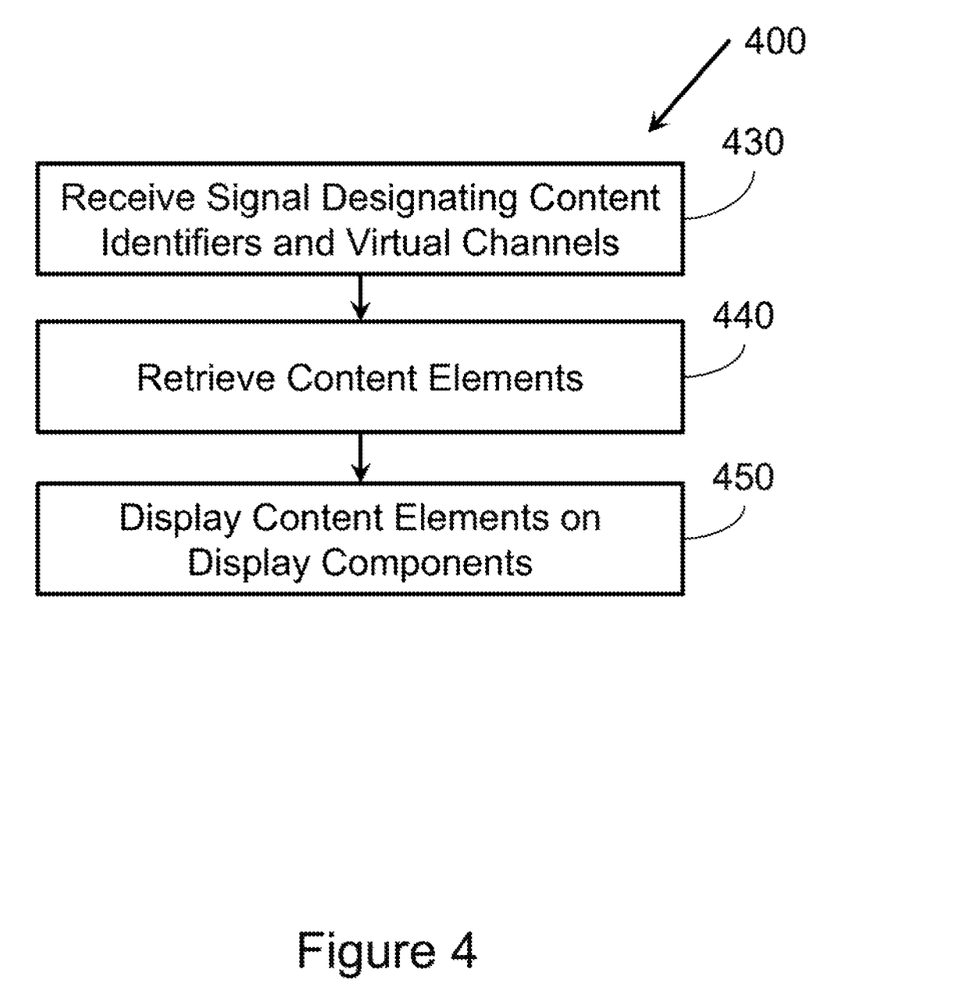
FIG. 4 illustrates another flowchart of example operations associated with display mapping.

FIG. 4 illustrates a method 400 associated with display mapping. Method 400 includes receiving a signal at 430. The signal may designate a set of virtual channels. The signal may also designate a set of content identifiers that specify content elements to be displayed on respective members of the set of virtual channels.

Method 400 also includes retrieving the content elements at 440. The content elements may be retrieved from respective sources of the content elements. By way of illustration, a webpage may be retrieved from a server hosting the webpage, a file may be loaded from a location in storage, and so forth.

Method 400 also includes displaying content elements on display components controlled by a system performing method 400 at 450. The content elements may be displayed according to a mapping between the virtual channels and the display components. For example, the mapping may cause a first content element to be displayed on a first display component that is mapped to the first virtual channel. This may be caused by a first content identifier specifying the first content element be displayed on the first virtual channel. Similarly, the mapping may cause a second content element to be displayed on a second display component that is mapped to the first virtual channel. This may be caused by a second content identifier specifying the second content element be displayed on the first virtual channel.

Figure 5:
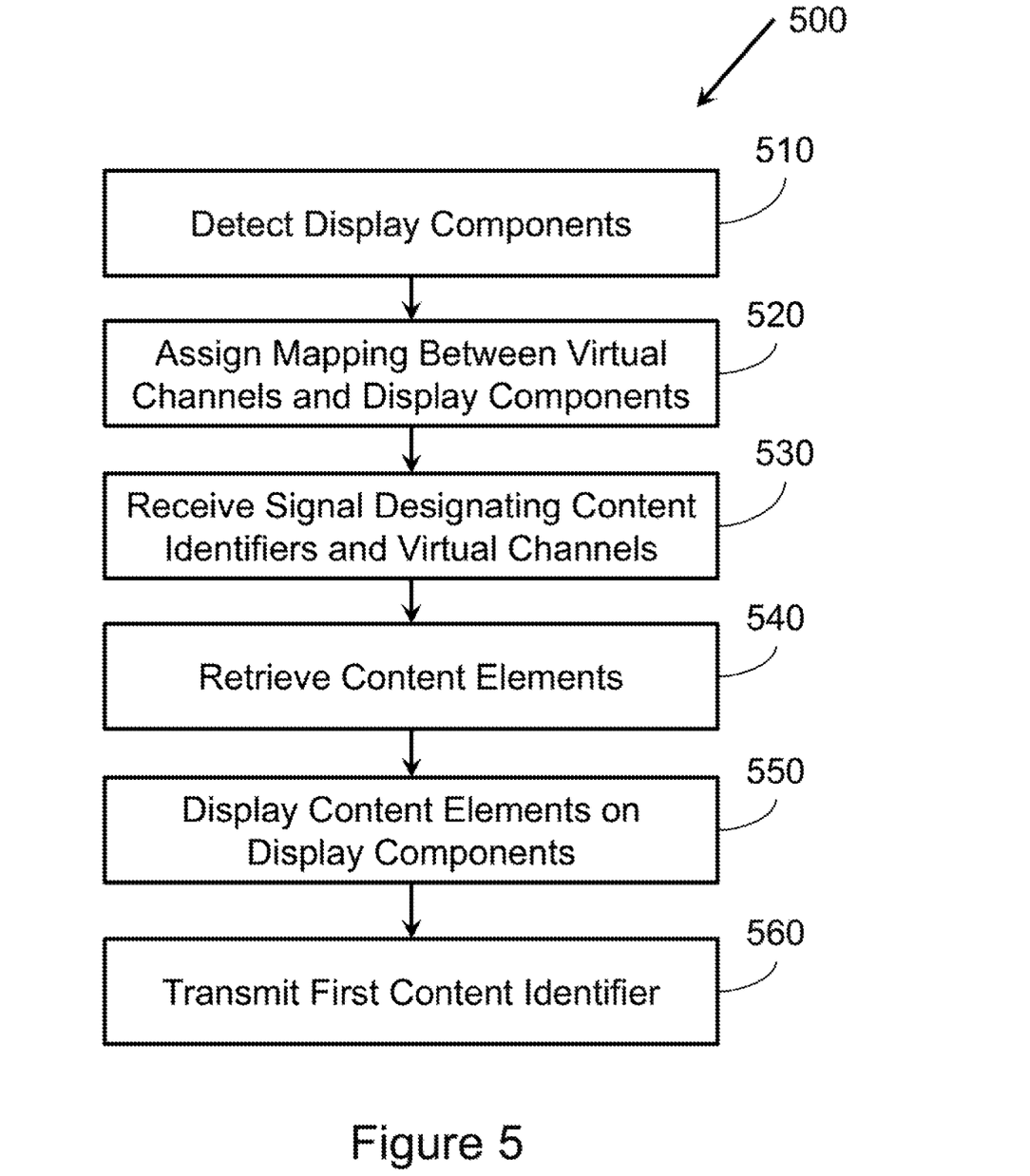
FIG. 5 illustrates another flowchart of example operations associated with display mapping.

FIG. 5 illustrates a method 500 associated with display mapping. Method 500 includes several actions similar to those described above with reference to method 400 (FIG. 4). For example, method 500 includes receiving a signal designating content identifiers and virtual channels at 530, retrieving content elements at 450, and displaying content elements on display components at 550.

Method 500 also includes detecting the display components at 510. Display components may be detected based on how they are detected to a system performing method 200. For example, monitors may be connected via various cable connections (e.g., VGA), and so forth.

Method 500 also includes assigning a mapping between the set of virtual channels and the display components at 520. This mapping may be controlled based on a user input, be performed automatically, and so forth.

Method 500 also includes transmitting the first content identifier at 560. The first content identifier may be transmitted to subscribers of the first virtual channel. When a subscriber of first virtual channel, receives the first content identifier, the subscriber nay retrieve the first content element and display the first content element on a display the subscriber has mapped to the first virtual channel.

Figure 6:
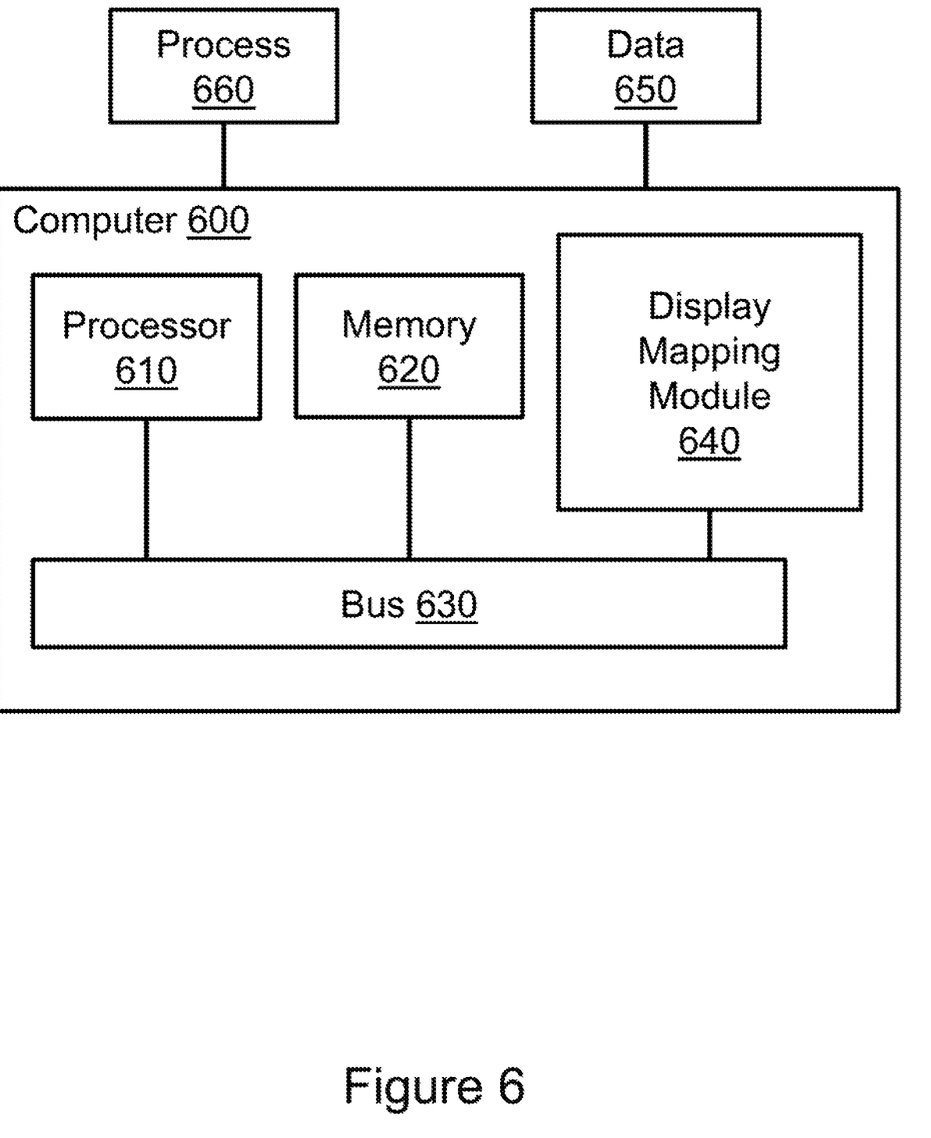
FIG. 6 illustrates an example computing device in which example systems, and methods, and equivalents, may operate.

FIG. 6 illustrates an example computing device in which example systems and methods, and equivalents, may operate. The example computing device may be a computer 600 that includes a processor 610 and a memory 620 connected by a bus 630. Computer 600 includes a display mapping module 640. Display mapping module 640 may perform, alone or in combination, various functions described above with reference to the example systems, methods, and so forth. In different examples, display mapping module 640 may be implemented as a non-transitory computer-readable medium storing processor-executable instructions, in hardware, software, firmware, an application specific integrated circuit, and/or combinations thereof.

The instructions may also be presented to computer 600 as data 650 and/or process 660 that are temporarily stored in memory 620 and then executed by processor 610. The processor 610 may be a variety of processors including dual microprocessor and other multi-processor architectures. Memory 620 may include non-volatile memory (e.g., read only memory) and/or volatile memory (e.g., random access memory). Memory 620 may also be, for example, a magnetic disk drive, a solid state disk drive, a floppy disk drive, a tape drive, a flash memory card, an optical disk, and so on. Thus, memory 620 may store process 660 and/or data 650. Computer 600 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A system, comprising:
a display mapping module to map a set of display components connected to the system to a set of virtual channels to which the system is subscribed;
a communication module to transmit a content instruction to subscribers of the virtual channels, where the content instruction is defined by a sender to include an identifier of a first content element, an identifier of a first virtual channel of the set of virtual channels on which the first content element is to be shown, an identifier of a second content element and an identifier of a second virtual channel of the set of virtual channels on which the second content element is to be shown to control the display components of the subscribers of the virtual channels to display the first content element and the second content element on respective display components of the set of display components in accordance with the content instruction; and
a display module to cause the display components mapped to the virtual channels to display the first content element and the second content element associated with the content instruction.

2. The system of claim 1, where the set of display components includes one or more of: a display, a portion of a display, a projector, a television, a mobile device, a tablet, an augmented reality system, a virtual reality system, and a monitor.

3. The system of claim 1, where the communication module is further to receive a received content instruction associated with a specified virtual channel to which the system is subscribed; and where the received content instruction controls the display module to cause a display component of the set of display components that is mapped to the specified virtual channel to display content associated with the received content instruction.

4. The system of claim 3, where the received content instruction includes the content to be displayed on the display component mapped to the specified virtual channel.

5. The system of claim 1, where the display mapping module is further to detect members of the set of display components connected to the system, to detect attributes of the members of the set of display components, and to report attributes of the members of the set of display components to a user to facilitate generating the mapping between the display components and the virtual channels.

6. The system of claim 1, comprising a preset module to control transmission of preset set of content instructions to subscribers of a preset set of the set of virtual channels.

7. The system of claim 1, where the content instruction identifies as content for display on the virtual channels, one or more of: a file, an image, an application, a set of data, a video, a location at which content may be obtained, and a video stream.

8. A method, comprising:
mapping a set of virtual channels to a set of display components;
receiving a signal defined by a sender to identify a first content element to be displayed on a first virtual channel of the set of virtual channels and a second content element to be displayed on a second virtual channel of the set of virtual channels;
transmitting an identifier of the first content element and an identifier of the second content element to subscribers of the virtual channels, where the identifier controls the display components of the set of display components of the subscribers to display the first content element on a first display component of the set of display components that is mapped to the first virtual channel and the second content element on a second display component of the set of display components that is mapped to a second virtual channel; and
displaying the first content element on the first display component that is mapped to the first virtual channel and the second content element on the second display component that is mapped to the second virtual channel.

9. The method of claim 8, where the signal identifying the first content element and the second content element ise received from a user of a first device and where the subscribers of the virtual channels are users remote to the user of the first device engaged in communication with the user of the first device.

10. The method of claim 8, comprising detecting members of the set of display components.

11. The method of claim 8, where a subscriber of the subscribers has a display setup that differs from the set of display components.

12. A non-transitory computer-readable medium storing computer executable instructions that, when executed, cause the computer to:
receive a signal defined by a sender to designate a set of virtual channels and a set of content identifiers specifying content elements to be displayed on respective members of the set of virtual channels;
retrieve the content elements from respective sources of the content elements; and
display the content elements on display components controlled by the computer according to a mapping between the virtual channels and the display components, where the mapping causes a first content element of the content elements, specified in a first content identifier to be displayed on a first virtual channel of the set of virtual channels, to be displayed on a first display component of the display components that is mapped to the first virtual channel, and where the mapping causes a second content element of the content elements, specified in a second content identifier to be displayed on a second virtual channel of the set of virtual channels, to be displayed on a second display component that is mapped to the second virtual channel of the set of virtual channels.

13. The non-transitory computer-readable medium of claim 12, where the instructions further cause the computer to:
transmit the first content identifier to subscribers of the first virtual channel, where the subscribers of the first virtual channel, when receiving the first content identifier:
retrieve the first content element; and
display the first content element on displays respective subscribers have mapped to the first virtual channel.

14. The non-transitory computer readable medium of claim 12, where the instructions further cause the computer to:
detect the display components; and
assign a mapping between the set of virtual channels and the display components.

* * * * *